US012669902B2

(12) United States Patent
Jang

(10) Patent No.: US 12,669,902 B2
(45) Date of Patent: Jun. 30, 2026

(54) DRIVING SIGNAL OUTPUT DEVICE, A DRIVING SIGNAL OUTPUT METHOD, AND A DISPLAY DEVICE

(71) Applicant: LX SEMICON CO., LTD., Daejeon (KR)

(72) Inventor: Moon Ho Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/853,288

(22) PCT Filed: Apr. 3, 2023

(86) PCT No.: PCT/KR2023/004443
§ 371 (c)(1),
(2) Date: Oct. 1, 2024

(87) PCT Pub. No.: WO2023/195711
PCT Pub. Date: Oct. 12, 2023

(65) Prior Publication Data
US 2025/0216990 A1      Jul. 3, 2025

(30) Foreign Application Priority Data

Apr. 6, 2022    (KR) ........................ 10-2022-0042800
Aug. 16, 2022    (KR) ........................ 10-2022-0102060

(51) Int. Cl.
*G06F 3/044*          (2006.01)
*G09G 3/36*          (2006.01)

(52) U.S. Cl.
CPC ........... *G06F 3/044* (2013.01); *G09G 3/3688* (2013.01); *G09G 2330/023* (2013.01); *G09G 2340/0435* (2013.01); *G09G 2354/00* (2013.01)

(58) Field of Classification Search
CPC .................. G06F 3/044; G09G 3/3688; G09G 2330/023; G09G 2340/0435; G09G 2354/00
(Continued)

(56) References Cited

U.S. PATENT DOCUMENTS 10,055,057 B2 *    8/2018    Kim ...................... G06F 3/0443
10,635,210 B2      4/2020    Yi et al.
(Continued)

FOREIGN PATENT DOCUMENTS

CN          106782259 A      5/2017
CN          107015687 A      8/2017
(Continued)

OTHER PUBLICATIONS

International Search Report issued for International Application No. PCT/KR2023/004443 on Jun. 26, 2023, 5 pages.

*Primary Examiner* — Kwin Xie
(74) *Attorney, Agent, or Firm* — ROTHWELL, FIGG, ERNST & MANBECK, P.C.

(57)          ABSTRACT

A driving signal output device according to an embodiment comprise a display driving circuit configured to output a display driving signal in a display interval within a first data writing interval, in a low-speed driving mode in which a data holding interval is located between data writing intervals, and a touch driving circuit configured to identify that a first touch is detected in a first touch sensing interval within the first data writing interval and to identify a position of the first touch in a second touch sensing interval within the first data writing interval.

20 Claims, 9 Drawing Sheets

(58) Field of Classification Search
USPC .................................................. 345/173–174
See application file for complete search history.

(56)                     References Cited

U.S. PATENT DOCUMENTS

| | | | |
|---|---|---|---|
| 10,775,921 B2 | 9/2020 | Cheng et al. | |
| 10,891,002 B2 * | 1/2021 | Feng ................... | G06F 3/04166 |
| 2017/0038898 A1 * | 2/2017 | Kim ....................... | G06F 3/0412 |
| 2017/0092198 A1 * | 3/2017 | Ryu ..................... | G09G 3/3275 |
| 2017/0153736 A1 | 6/2017 | Kim et al. | |
| 2018/0275827 A1 | 9/2018 | Lin et al. | |
| 2020/0210021 A1 * | 7/2020 | Ju ....................... | G06F 3/04162 |
| 2021/0181893 A1 | 6/2021 | Bae et al. | |

FOREIGN PATENT DOCUMENTS

| | | | | | |
|---|---|---|---|---|---|
| CN | 107977112 A | | 5/2018 | | |
| KR | 10-2017-0064599 A | | 6/2017 | | |
| KR | 20170080157 A | * | 7/2017 | .......... | G06F 3/0412 |
| KR | 10-2018-0079088 A | | 7/2018 | | |
| KR | 10-2018-0109000 A | | 10/2018 | | |
| KR | 10-2380214 B1 | | 3/2022 | | |

* cited by examiner

T11 T12          T21 T22

Display | Touch recognition | Display

Figure 11:
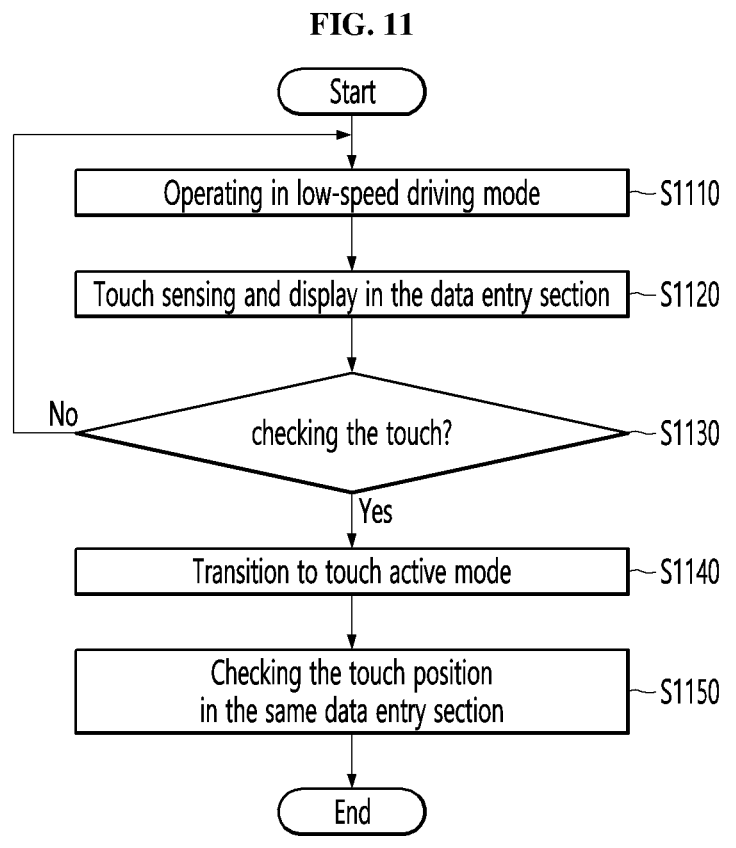

```
                    ( Start )
                        │
                        ▼
        ┌──────────────────────────────────────┐
  ┌────▶│   Operating in low-speed driving mode  │─── S1110
  │     └──────────────────────────────────────┘
  │                     │
  │                     ▼
  │     ┌──────────────────────────────────────────┐
  │     │ Touch sensing and display in the data entry section │─── S1120
  │     └──────────────────────────────────────────┘
  │                     │
  │                     ▼
  │ No        ◇─────────────────────◇
  └──────────◇   checking the touch?  ◇─── S1130
              ◇─────────────────────◇
                        │ Yes
                        ▼
        ┌──────────────────────────────────────┐
        │     Transition to touch active mode    │─── S1140
        └──────────────────────────────────────┘
                        │
                        ▼
        ┌──────────────────────────────────────┐
        │        Checking the touch position      │─── S1150
        │     in the same data entry section      │
        └──────────────────────────────────────┘
                        │
                        ▼
                    ( End )
```

DRIVING SIGNAL OUTPUT DEVICE, A DRIVING SIGNAL OUTPUT METHOD, AND A DISPLAY DEVICE

CROSS-REFERENCE TO RELATED APPLICATION(S)

This application is a 35 U.S.C. § 371 National Phase Entry Application from PCT/KR2023/004443, filed on Apr. 3, 2023, which claims the benefits of Korean Patent Application No. 10-2022-0042800, filed on Apr. 6, 2022, and Korean Patent Application No. 10-2022-0102060, filed on Aug. 16, 2022, all of the disclosures of which are herein incorporated by reference in their entirety.

BACKGROUND OF THE DISCLOSURE

Field

The present embodiment relates to a driving signal output device, a driving signal output method, and a display device including a driving signal output circuit.

Background

As informatization progresses, various display devices capable of visualizing information are being developed. A liquid crystal display (LCD) device, an organic light emitting diode (OLED) display device, a plasma display panel (PDP) display device, etc. are developed or are being developed. These display devices are evolving to properly display high-resolution images.

The display panel configured in various electronic devices (e.g., TV, laptop, mobile device, etc.) employ a lot of touch functions. In this case, the display panel is implemented as a flat panel display device. The touch function may be implemented as a touch panel combined with the display panel. The touch panel means to a panel having a function of operating a device or executing a program when a user presses text, an image, an icon or the like.

The touch panel may be configured to perform touch recognition capacitively, for example. As an example of a touch panel implementing capacitive touch recognition, a "mutual capacitance touch sensing device" has been proposed. A touch pattern as an example has a configuration independent of the display panel. The touch panel may be manufactured separately and combined with the display panel. The configuration in which the touch panel and the display panel are combined as described above causes various difficulties such as complexity of the process and increase in manufacturing cost.

In order to solve this problem, development of a device in which parts for display and parts for touch recognition are shared is being promoted. As a representative example, there is an in-cell method. The in-cell method means implementing touch recognition by having a configuration for implementing a touch function in a pixel of the display panel. Various in-cell methods have been developed. A pixel implemented in the in-cell method may have a function of implementing display and touch recognition in parallel. For example, in a device that provides both a touch function and a display function (hereinafter referred to as a 'display device'), a touch operation and a display operation may be operated in a time-division manner by a display driving signal and a touch driving signal.

According to an embodiment, the display device may operate in a low-speed driving mode (e.g., low refresh rate (LRR) mode) in which a display refresh rate is lowered to reduce power consumption when there is no change in the display. In the low-speed driving mode, the display device may be configured to perform only minimal touch sensing (e.g., one touch sensing) per display frame in order to reduce power consumption. As a result, a touch operation in the low-speed driving mode may be delayed.

Accordingly, there is a need for a method capable of reducing a delay of a touch operation in the low-speed driving mode.

SUMMARY OF THE DISCLOSURE

Against this background, one object of the present embodiment is to provide a driving signal output device, a driving signal output method, and a display device capable of reducing the delay of a touch operation by enabling identification of the presence or absence of a touch and identification of a touch position within one data writing interval when the display device operates in a low-speed driving mode.

In order to achieve the foregoing purpose, a driving signal output device according to an embodiment, comprising: a display driving circuit configured to output a display driving signal in a display interval within a first data writing interval, in a low-speed driving mode in which a data holding interval is located between data writing intervals; and a touch driving circuit configured to identify that a first touch is detected in a first touch sensing interval within the first data writing interval and to identify a position of the first touch in a second touch sensing interval within the first data writing interval.

A driving signal output method according to the other embodiment, comprising: operating in a low-speed driving mode in which a data holding interval is located between data writing intervals; outputting a display driving signal in a display interval within a first data writing interval in the low-speed driving mode; identifying that a first touch is detected in a first touch sensing interval within the first data writing interval; and identifying a position of the first touch in a second touch sensing interval within the first data writing interval in response to identifying that the first touch is detected.

A display device according to another embodiment, comprising: a panel; a display driving circuit configured to output a display driving signal to the panel in a display interval within a first data writing interval, in a low-speed driving mode in which a data holding interval is located between data writing intervals; and a touch driving circuit configured to identify that a first touch is detected in a first touch sensing interval within the first data writing interval and to identify a position of the first touch in a second touch sensing interval within the first data writing interval.

As described above, according to the present embodiment, when the display device operates in the low-speed driving mode, the delay of a touch operation can be reduced by enabling identification of the presence or absence of a touch and identification of a touch position within one data writing interval.

For example, according to the present embodiment, when the display device operates from a touch idle mode to a LRR mode, a position touched in the same idle frame can be reported when a touch is detected. Accordingly, the display frame rate can be immediately increased.

BRIEF DESCRIPTION OF THE DRAWINGS

FIG. 11 is a flowchart illustrating a touch sensing method according to an embodiment.

DETAILED DESCRIPTION OF EMBODIMENTS

A touch display device according to embodiments of the present invention may perform display and touch sensing (or touch recognition) in a time-division manner, and may comprise a configuration in which parts for display and parts for touch recognition are shared in a built-in in-cell manner. However, the present embodiments are not limited to the time division method or the in-cell method. For example, the touch display device of the embodiments described below may be implemented in an on-cell type method among an external type method and a built-in type method.

According to various embodiments, display and touch recognition of a touch display device may be implemented as separate operations. Here, the display means expressing a target image by driving pixels of a display panel. The touch recognition means recognizing a touch position on a display panel. The time division method means that display and touch recognition are alternately performed sequentially for each time domain.

More specifically, the time division method may be implemented such that display and touch recognition alternate in units of frames constituting an image. That is, display and touch recognition may be sequentially and alternately performed corresponding to a plurality of frames constituting an image. In addition, in the time division method, two or more touch recognitions may be performed within each frame constituting an image.

The in-cell method means implemented so that display and touch recognition can be simultaneously performed on pixels in a display panel. For this purpose, a shared part that can provide capacitance for touch recognition may be used. At least the connection points of the part may be included. An example of the connection point may be a node (COM) for applying a common voltage, but is not limited thereto, and various parts may be used as the connection point according to the intention of the manufacturer.

Figure 1:
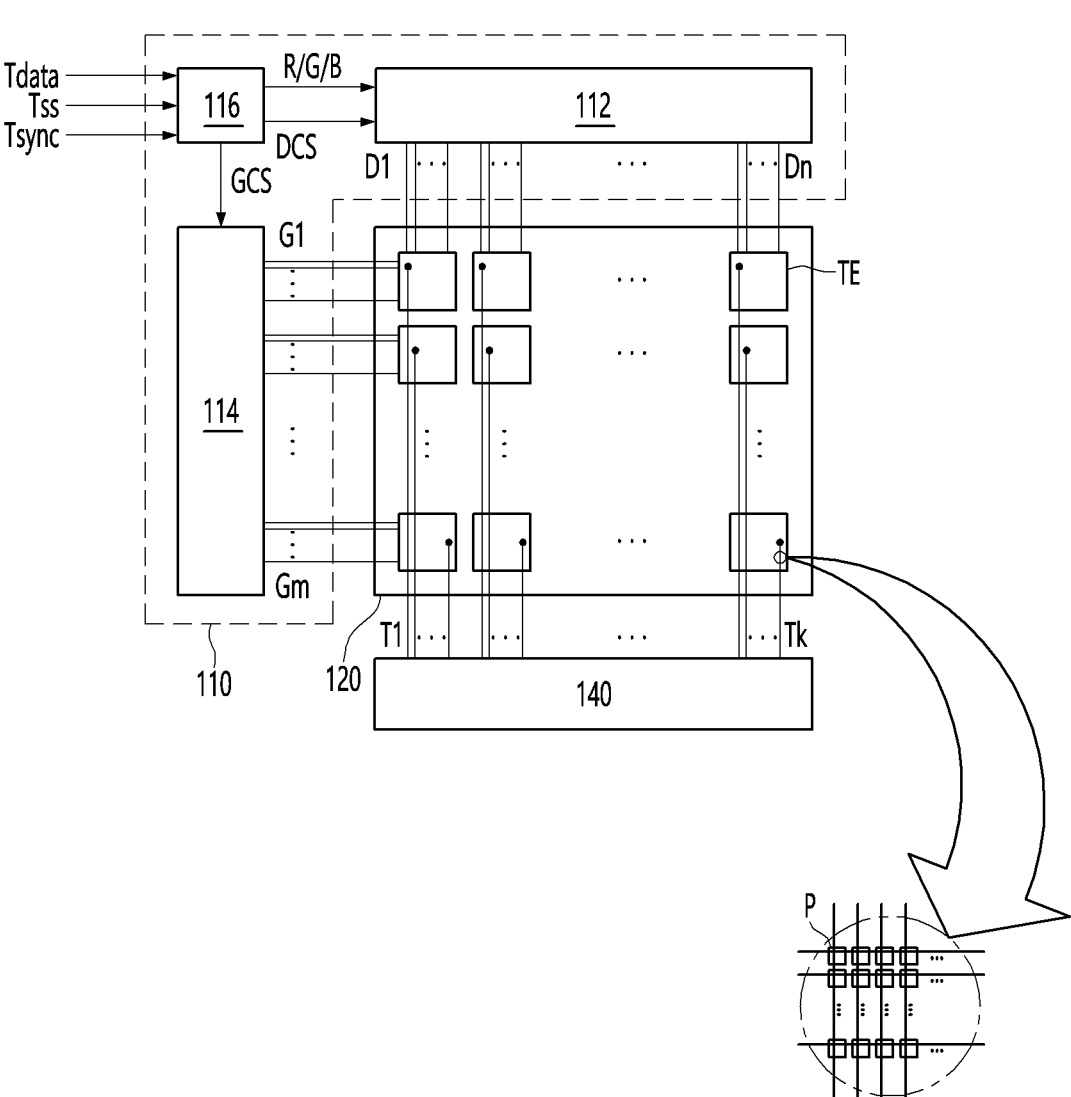
FIG. 1 is a block diagram of a display device according to an embodiment.

FIG. 1 is a configuration diagram of a display device including a touch sensing device according to an embodiment of the present invention. As shown in FIG. 1, the display device 100 according to an embodiment of the present invention performs a display function and a touch sensing function. The display device 100 according to an embodiment of the present invention may be implemented as a flat panel display such as a liquid crystal display (LCD) or an organic light emitting diode (OLED) display. In the embodiments to be described later, the LCD is exemplified, but the present invention is not limited thereto. That is, the same or similar can be applied to displays based on LED or OLED.

In one embodiment, the display device 100 according to the present invention may include a capacitive touch screen. The touch screen may be integrally implemented inside the display device 100 to sense a touch caused by a contact of a conductive object such as a finger or an active pen. Such a touch screen may be configured in a form independent of a display panel for display implementation, or may be embedded in a pixel array of a display panel.

As shown in FIG. 1, the display device 100 according to an embodiment of the present invention may comprise a panel driving device 110, a panel 120 (e.g., a display panel or a touch panel), and a touch sensing unit 140 (e.g., a touch sensing device, a touch driving circuit, a touch sensing circuitry, a touch controller, or a touch micro controller unit (MCU)).

The panel 120 displays an image of a predetermined gray level or receives a touch input by a hand (or finger) or an active pen (or electronic pen). The panel 120 may be a display panel having an in-cell touch type structure using a capacitance method. In one embodiment, the panel 120 may be an in-cell touch type display panel using a self-capacitance method or an in-cell touch type display panel using a mutual capacitance method. Hereinafter, for convenience of description, it will be assumed that the panel 120 is a self-capacitance in-cell touch type display panel.

The panel 120 may operate in a display mode and a touch sensing mode. The panel 120 may display an image during the display mode and serve as a touch panel for touch sensing during the touch sensing mode.

The panel driving device 110 may comprise a data driving circuit 112 (e.g., a data driving circuit, a source driver circuit, a source driver integrated circuit (SDIC), a display driving circuit, etc.)), a gate driving circuit 114, and a timing controller 116 (e.g., a controller, a control unit, and a T-CON)). Each of the data driving circuit 112, the gate driving circuit 114, and the touch sensing unit 140 may drive at least one element included in the panel 120.

The data driving circuit 112 may drive data lines DL (e.g., D1 to Dn) connected to pixels P. The gate driving circuit 114 may drive gate lines GL (e.g., G1 to Gm) connected to the pixels P. The touch sensing unit 140 may drive electrodes (EL) or touch electrodes (TE) disposed on the panel 120.

The data driving circuit 112 may supply a data voltage to the data line DL to display an image on each pixel P of the panel 120. The data driving circuit 112 may include at least one data driver integrated circuit. At least one data driver integrated circuit may be connected to the bonding pad of the panel 120 by using a tape automated bonding (TAB) method or be formed directly on panel 120 or a chip on glass (COG) method. At least one data driver integrated circuit may be integrated into the panel 120 in some cases. In addition, the data driving circuit 112 may be implemented in a chip on film (COF) method.

The gate driving circuit 114 may supply a scan signal to the gate line GL to turn on/off a switch (e.g., transistor) positioned in each pixel P. The gate driving circuit 114 may be located on only one side of the panel 120 as shown in FIG. 1 or may be divided into two and located on both sides of the panel 120 according to a driving method. In addition, the gate driving circuit 114 may include at least one gate driver integrated circuit. At least one gate driver integrated circuit may be connected to the bonding pad of the panel 120 by using a tape automated bonding (TAB) method or a chip-on-glass (COG) method, or may be formed directly on panel 120 by using a gate-in-panel (GIP) type method. At least one gate driver integrated circuit may be integrated on the panel 120 in some cases. In addition, the gate driving circuit 114 may be implemented in a chip on film (COF) method.

The panel 120 may include only a touch screen panel (TSP) and may further include a display panel. Here, the touch panel and the display panel may share some elements with each other. For example, a touch electrode TE for sensing a touch in a touch panel may be used as a common voltage electrode supplied with a common voltage in a display panel.

In the aspect that some elements of the display panel and the touch panel are shared with each other, such a panel 120 is sometimes referred to as an integrated panel, but the present invention is not limited thereto. In addition, an in-cell type panel is known as a form in which a display panel and a touch panel are integrally coupled. However, this is only an example of the aforementioned panel 120 and the panel to which the present invention is applied is not limited to such an in-cell type panel.

Meanwhile, a plurality of touch electrodes TE may be disposed on the panel 120, and the touch sensing unit 140 may drive the touch electrode TE using a driving signal. The touch sensing unit 140 may generate a sensing value for the touch electrode TE according to a response signal formed on the touch electrode TE in response to the driving signal. The touch sensing unit 140 may calculate touch coordinates using sensing values of the plurality of touch electrodes TE disposed on the panel 120. The calculated touch coordinates may be transmitted to and utilized by another device (e.g., a host, controller, or processor).

According to an embodiment, the pixel P may comprise a transistor (e.g., TFT), a liquid crystal LC, and a common voltage electrode VCOM. A gate terminal of the transistor TFT may be connected to the gate line GL, a drain terminal may be connected to the data line DL, and a source terminal may be connected to the liquid crystal LC.

The scan signal SCAN corresponding to a turn-on voltage may be supplied to the gate terminal through the gate line GL. In this case, the drain terminal and the source terminal of the transistor TFT may be conducted and the data voltage Vdata may be supplied to the liquid crystal LC. A common voltage may be supplied to the common voltage electrode VCOM. The brightness of the pixel P may be adjusted while the liquid crystal LC is controlled according to the difference between the common voltage and the data voltage Vdata.

Meanwhile, the common voltage electrode VCOM may be the same electrode as the touch electrode TE driven by the touch sensing unit (see 140 in FIG. 1) described with reference to FIG. 1. This has been described as an example, but the embodiments of the present invention are not limited thereto.

According to an embodiment, the touch sensing unit 140 may drive the touch electrode TE by using the driving signal Stx. The touch sensing unit 140 may sense the touch or proximity of the external object OBJ to the panel according to the response signal Srx formed on the touch electrode TE in response to the driving signal Stx.

In this case, the touch sensing unit 140 may employ a capacitive touch method. In the capacitive touch method, the proximity or touch of the object OBJ may be recognized by detecting capacitance or capacitance change of the touch electrode TE.

Such a capacitive touch method may be divided into, for example, a mutual capacitance touch method and a self-capacitance touch method. In the mutual capacitance touch method, which is a type of capacitive touch method, a driving signal Stx is applied to one touch electrode, and another touch electrode mutually coupled with one touch electrode is sensed. In this mutual capacitance touch method, a value sensed by another touch electrode may vary according to the touch or proximity of an object OBJ such as a finger or a pen. In the mutual capacitance touch method, the presence or absence of a touch, a touch coordinate or the like can be detected by using the sensed value.

In the self-capacitance touch method, which is another type of capacitive touch method, a driving signal Stx is applied to one touch electrode and then the corresponding one touch electrode is sensed again. In this self-capacitance touch method, a value sensed by a corresponding touch electrode may vary according to a touch or proximity of an object OBJ such as a finger or a pen. In the self-capacitance touch method, the presence or absence of a touch, a touch coordinate, or the like can be detected by using the sensed value.

In this self-capacitance touch method, the touch electrode for applying the driving signal Stx and the touch electrode for sensing may be the same. An embodiment can be applied to both the mutual capacitance touch method and the self-capacitance touch method. In some examples below, for convenience of explanation, a case in which an embodiment is applied to a self-capacitive touch method will be described.

According to an embodiment, the timing controller 116 may provide a display control signal to the data driving circuit 112 and the gate driving circuit 114 and provide a touch control signal to the touch sensing unit 140 such that the display and touch recognition may be performed in a time division manner.

The timing controller 116 may output a display control signal. The display control signal may comprise a source control signal, a gate control signal, a clock pulse, a horizontal synchronization signal or a vertical synchronization signal, and a switching signal SW.

The data driving circuit 112 may be configured to receive source control signals included in the display control signal, generate source driving signals corresponding to the source control signals, and provide the generated source driving signals to pixels of the panel 120. The data driving circuit 112 may typically comprise a latch, a digital-to-analog converter, and an output buffer. Here, the latch may store data according to the source control signal and then provide the data to the digital-to-analog converter. The digital-to-analog converter may output an analog signal of a voltage corresponding to the data. The output buffer may transmit the output of the digital-to-analog converter as a source driving signal to the pixel of the panel 120 through the source line SL.

The gate driving circuit 114 may receive gate control signals included in the display control signal, generate gate driving signals corresponding to the gate control signals, and provide the generated gate driving signals to the pixels of the panel 120. The gate driving circuit 114 may include an input buffer, a shift register, a level shifter, and an output buffer according to an embodiment.

The input buffer may receive the gate control signal and output the gate control signal to the shift register. The shift register may control scan pulses, which are the gate control signals transmitted through the input buffer, to be sequentially generated in units of columns of the panel 120. The level shifter may change the output voltage level of the shift register to have a level capable of turning on/off the thin film transistor TFT composed of the switch M. The output buffer may change a signal output from the level shifter and output the changed signal as a gate driving signal so as to drive the gate line GL having an RC load.

Figures 2, 3:
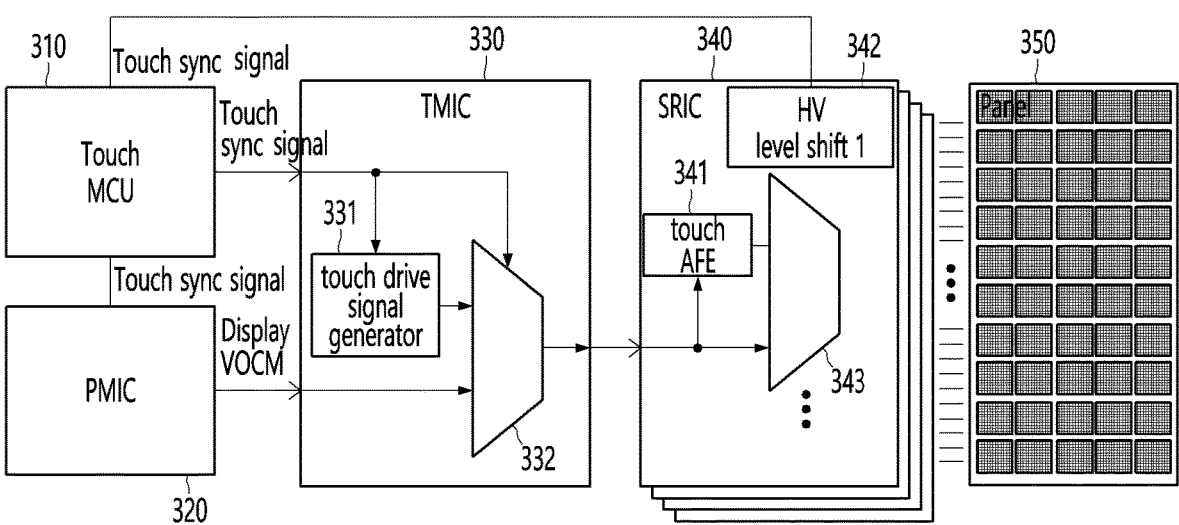
FIG. 2 is a timing diagram illustrating a method of driving a display device according to an embodiment.
FIG. 3 is a detailed configuration diagram of a display device according to an embodiment.

FIG. 2 is a timing diagram illustrating a method of driving a display device according to an embodiment. Referring to FIG. 2, the above-described embodiment of FIG. 1 can be driven in a time-division manner by sequentially and alternately allocating display and touch recognition to successive time domains as shown in FIG. 2.

According to an embodiment, the timing controller 116 may provide a source control signal and a gate control signal to the data driving circuit 112 and the gate driving circuit 114, respectively, for display. The timing controller 116 may control not to activate the output of the touch driving signal TDS by providing a touch control signal to the touch sensing unit 140 in the time domain set as the display interval. In FIG. 2, a time point T1 is a time point when entering a touch recognition state from a display state, and a time point T2 may be a time point when entering a display state from a touch recognition state.

According to an embodiment, the timing controller 116 may perform a control for touch recognition when a time set for displaying an image elapses. The timing controller 116 may activate the output of the touch driving signal TDS by providing a touch control signal to the touch sensing unit 140 to perform touch recognition. Under the control of the timing controller 116, the touch driving signal TDS, which is a constant voltage, may be applied to each pixel node.

In the configuration described above, the timing controller 116 may switch the switch to the floating state at a time point T11 that is a predetermined time earlier than time T1 set as the time point at which the touch recognition state is entered from the display state. Alternatively, the timing controller 116 may switch the switch to a floating state at a time T12 that is a predetermined time later than time T1 set as the time point at which the touch recognition state is entered from the display state.

FIG. 3 is a detailed configuration diagram of a display device according to an embodiment. Referring to FIG. 3, a touch display device may comprise a touch control circuit 310 (touch micro control unit (MCU)), a power management circuit 320 (power management IC; PMIC), and a touch driving circuit 330 (touch modulation IC; TMIC), a driving signal output circuit 340 (e.g., a source driver and touch readout IC (SRIC)), and a panel 350. The display device shown in FIG. 3 is only an example, and embodiments to be described later are not limited to the detailed configuration of FIG. 3

According to an embodiment, the touch control circuit 310 may provide a synchronization signal to the power management circuit 320, the touch driving circuit 330, and the driving signal output circuit 340. The synchronization signal may include a synchronization signal for distinguishing a display interval or a touch sensing interval. The synchronization signal may be referred to as a display synchronization signal or a touch synchronization signal. The touch control circuit 310 may be configured to include at least some functions of the timing controller 116 shown in FIG. 1 or may be replaced with the timing controller 116.

According to an embodiment, the power management circuit 320 may receive a synchronization signal (e.g., a touch synchronization signal) from the touch control circuit 310 and output a display driving signal (display VCOM) based on the received synchronization signal. For example, the display driving signal may have a voltage of –1V.

According to an embodiment, the touch driving circuit 330 may comprise a touch driving signal generator 331 and a first multiplexer 332. The touch driving circuit 330 may receive a synchronization signal from the touch control circuit 310 and generate a touch driving signal (touch VCOM) based on the received synchronization signal.

For example, the touch driving signal generator 331 may generate a touch driving signal based on a synchronization signal (e.g., a touch synchronization signal) received from the touch control circuit 310. According to one embodiment, the touch driving signal may be configured in a pulse form having a voltage range of 1V to 4V. The first multiplexer 332 of the touch driving circuit 330 may receive the touch driving signal output from the touch driving signal generator 331 and the display driving signal output from the power management circuit 320, and selectively outputs the touch driving signal and the display driving signal.

For example, the first multiplexer 332 may selectively output one of the input display driving signal and the touch driving signal based on the synchronization signal provided from the touch control circuit 310.

For example, the first multiplexer 332 may output a display driving signal during a display operation interval in which an image is displayed on the panel 350. The first multiplexer 332 may output a touch driving signal during a touch sensing operation interval in which a touch is sensed from the panel 350.

The display driving signal or the touch driving signal output from the first multiplexer 332 of the touch driving circuit 330 may be transmitted to the driving signal output circuit 340. The touch driving circuit 330 may be configured to include at least some functions of the touch sensing unit 140 shown in FIG. 1 or may be replaced with the touch sensing unit 140.

According to an embodiment, the driving signal output circuit 340 may comprise a touch analog front end (AFE) 341, a high voltage (HV) level shifter 342, and a second multiplexer 343.

According to an embodiment, the HV level shifter 342 of the driving signal output circuit 340 may receive a synchronization signal from the touch control circuit 310, and supply VDD signal to the second multiplexer 343 based on the received synchronization signal.

For example, since a signal input to the second multiplexer 343 includes a display driving signal in a first voltage range and a touch driving signal in a second voltage range, the HV level shifter 342 may supply HV level signal (HVDD) (e.g. 17V) to the second multiplexer 343.

The second multiplexer 343 of the driving signal output circuit 340 may selectively output a display driving signal in a first voltage range or a touch driving signal in a second voltage range based on the HV level signal HVDD supplied from the HV level shifter 342.

In addition, the second multiplexer 343 may include a channel multiplexer and selectively output a driving signal for each channel corresponding to each pixel of the panel 350. In the description of the embodiments to be described later, the function of the second multiplexer 343 selectively outputting a driving signal for each channel will be omitted.

For example, the second multiplexer 343 may output a display driving signal to the panel 350 during a display operation interval in which an image is displayed on the panel 350. The second multiplexer 343 may output a touch driving signal to the panel 350 during a touch sensing operation interval in which a touch is sensed from the panel 350.

According to an embodiment, during the touch sensing operation interval, the second multiplexer 343 may receive a signal sensed from the panel 350 and supply the signal to the touch AFE 341. The touch AFE 341 can determine whether or not a touch has been made based on the signal sensed from the panel 350. Since a well-known technique can be used for the method of determining whether or not a touch has been made through the touch AFE 341, a detailed description will be omitted.

Figure 4:
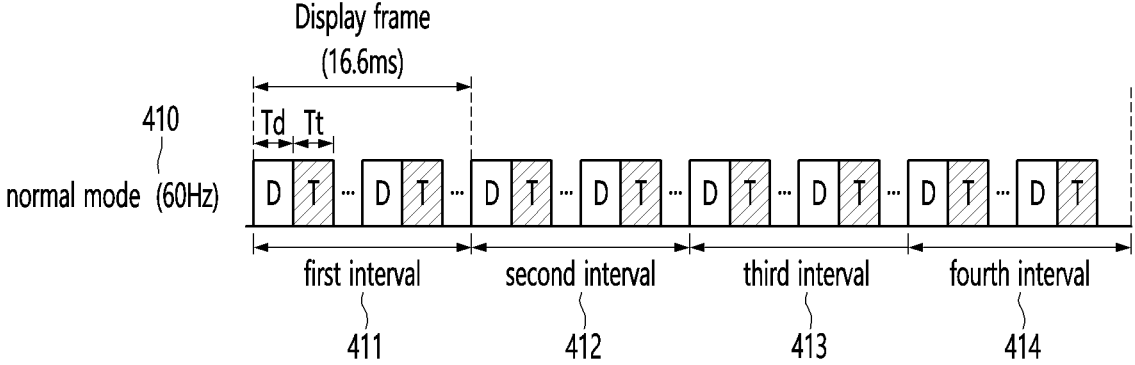
FIG. 4 is a diagram illustrating a normal mode operation of a display device according to an embodiment.
Figure 5:
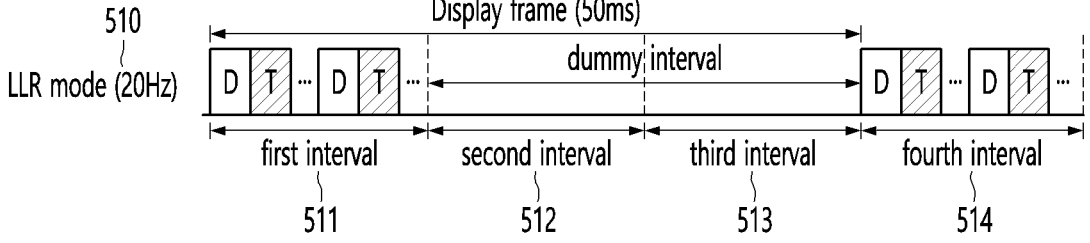
FIG. 5 is a diagram illustrating an operation of a display device in a low-speed driving mode according to an embodiment.

FIG. 4 is a diagram illustrating a normal mode operation of a display device according to an embodiment, and FIG. 5 is a diagram illustrating an operation of a display device in a low-speed driving mode according to an embodiment.

According to an embodiment, the timing controller 116 of FIG. 1 may confirm a basic driving mode or a low-speed driving mode based on a mode control signal MOD received from a host system. The timing controller 116 may determine a mode as the low-speed driving mode when the mode control signal MOD is input at a first logic level. The timing controller 116 may determine a mode as the basic driving mode when the mode control signal MOD is input at the second logic level. Here, the first logic level may be a high level and the second logic level may be a low level, or vice versa.

According to an embodiment, the basic driving mode and the low-speed driving mode may be determined according to a display frame rate. The low-speed driving mode may control data writing cycle of pixels to be relatively longer by lowering a driving frequency for operating the display device when the input image does not change by a preset number of frames (e.g., when a still image is input for a certain period of time or longer). Accordingly, power consumption may be reduced.

In the low-speed driving mode, a refresh rate at which pixel data is updated in the panel 120 may be relatively slow compared to the basic driving mode. For example, when the driving frequency is 60 Hz in the basic driving mode, the driving frequency in the low-speed driving mode may be relatively slow compared to the basic driving mode, such as 30 Hz, 20 Hz, . . . , 1 Hz, and the like. The low-speed driving mode is not limited to the timing or condition of inputting a still image.

For example, when the display device operates in a standby mode or when a user command or an input image is not input to the data driving circuit 112 for a predetermined period of time or longer, the display device may operate in a low-speed drive mode. In the following description, as an example of the basic driving mode, a case where a display refresh rate is 60 Hz will be described as an example. For example, as an example of the low-speed driving mode, a case where the display refresh rate is 20 Hz will be described as an example of the low-speed driving mode. The basic driving mode may also be referred to as a normal mode. The low-speed driving mode may also be referred to as a low refresh rate (LRR) mode.

According to one embodiment, referring to FIG. 4, in a basic driving mode (e.g., normal mode 410), a display frame may include only data writing frames (WRs). Each of a first section 411, a second section 412, a third section 413, and a fourth section 414 may correspond to one display frame.

For example, the first section 411 may be referred to as a first data writing interval, and the second section 412 may be referred to as a second data writing interval. The third section 413 may be referred to as a third data writing interval, and the fourth section 414 may be referred to as a fourth data writing interval. Assuming that each interval 411, 412, 413, 414 has a length of 16.6 ms, the display refresh rate may be about 60 Hz (1000/16.6).

In each of the intervals 411, 412, 413, and 414, the display interval Td indicated by 'D' and the touch sensing interval Tt indicated by 'T' may be alternately repeated. In the display interval Td within each of the data writing intervals 411, 412, 413, and 414, the data driving circuit 112 may be configured to output a display driving signal to the panel 120. In the touch sensing interval Tt in each data writing interval 411, 412, 413, 414, the touch sensing unit 140 may detect a touch sensing to identify whether or not there is the presence or absence of a touch or identify a touch position (e.g., touch coordinate).

As described above, in the basic driving mode (e.g., the normal mode 410), the display frame may consist of only data writing frames (WRs). On the other hand, referring to FIG. 5, in the low-speed driving mode (e.g., LRR mode 510), the display frame may further include data holding frames (HF) in addition to the data writing frames WF.

The data retaining frames HF may only perform a role of retaining pixel data written in the data writing frames WF. In the data holding frames HF, it is possible to control not to write new pixel data to the display panel 120. Referring to FIG. 5, a first section 511, a second section 512, and a third section 513 may correspond to one display frame. Thereafter, two consecutive intervals including the fourth section 514 may correspond to another display frame. According to an embodiment, the first section 511 and the fourth section 514 may be referred to as a data writing interval, respectively.

For example, the first section 511 may be referred to as a first data writing interval, and the fourth section 514 may be referred to as a second data writing interval. According to an embodiment, a data holding interval of the second section 512 and the third section 513 may be located between the first section 511, which is the first data writing interval, and the fourth section 514, which is the second data writing interval. The data holding interval may be referred to as a dummy section. Assuming that the first section 511 is 16.6 ms and the second section 512 and the third section 513 are 33.4 ms, one display frame may be 50 ms.

As such, when it is assumed that one display frame has a length of 50 ms, a display refresh rate may be 20 Hz (1000/50). In the first section 511 and the fourth section 514, the display interval Td indicated by 'D' and the touch sensing interval Tt indicated by 'T' may be alternately repeated. In the display interval Td in each of the data writing intervals 511 and 514, the data driving circuit 112 may be configured to output a display driving signal to the panel 120. In the touch sensing interval Tt in each of the data writing intervals 511 and 514, the touch sensing unit 140 may detect a touch sensing to identify whether or not there is the presence or absence of a touch or identify a touch position (e.g., touch coordinate).

According to an embodiment, the larger the number or the longer the length of the data holding frames 512 and 513 located between the adjacent data writing frames 511 and 514, the display frame rate may be slow.

For example, it is assumed that the basic driving mode is 60 Hz. In this case, the low-speed driving mode in which one data holding frame HF exists between adjacent data writing frames WF may be 30 Hz. A low-speed driving mode in which two data holding frames HF exist between adjacent data writing frames WF may be 20 Hz. A low-speed driving mode in which 59 data holding frames HF exist between adjacent data writing frames WF may be 1 Hz. For example, a display refresh rate of the low-speed driving mode (e.g., LRR mode 510) may be determined based on the data holding frame or the width of the data holding interval.

Figure 6:
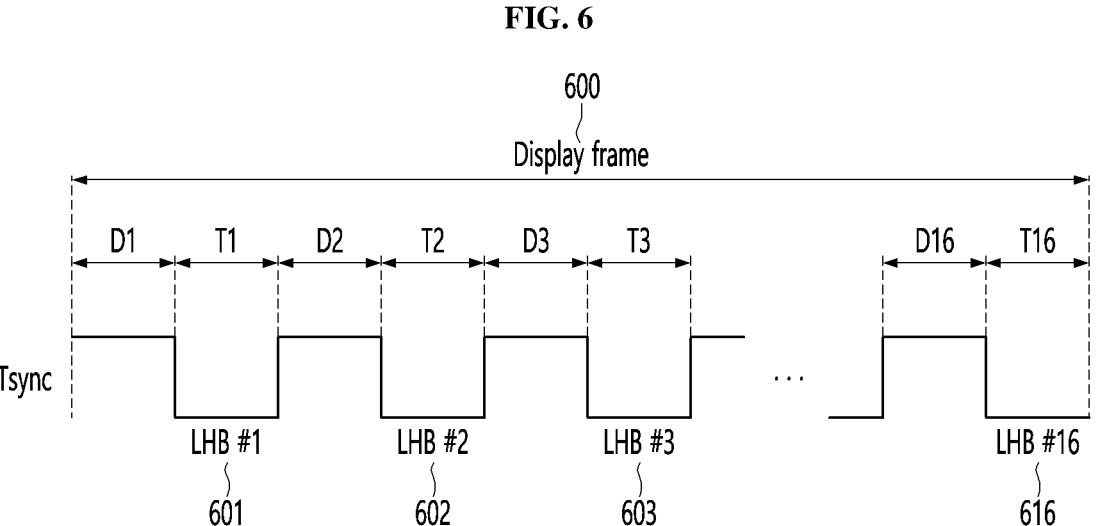
FIG. 6 is a diagram of a synchronization signal defining a display interval and a touch sensing interval according to an embodiment.

FIG. 6 is a diagram of a synchronization signal defining a display interval and a touch sensing interval according to an embodiment.

Referring to FIG. 6, the display device according to an embodiment may perform display driving for displaying a screen during a predetermined display driving period (or display interval) D1, D2, . . . , D16. The display device according to an embodiment may perform touch driving for sensing a touch input by a finger or a stylus during a predetermined touch driving period (or touch sensing interval) (T1, T2, . . . , T16).

According to an embodiment, the display interval and the touch sensing interval may be temporally identical or overlapping periods, or may be temporally separated periods. When the display interval and the touch sensing interval are temporally identical, display driving and touch driving may be simultaneously performed. On the other hand, when the display interval and the touch sensing interval are temporally separated periods, the display interval and the touch sensing interval may alternate.

According to an embodiment, when a display interval and a touch sensing interval are separated in time while alternating, the touch sensing interval may correspond to a blank period in which display driving is not performed. The display device may generate a touch synchronization signal Tsync that swings between a high level and a low level, and identify or control a display interval and a touch sensing interval based on the touch synchronization signal Tsync. For example, the touch synchronization signal Tsync may be a driving timing control signal defining a touch sensing interval.

For example, a high level interval (or a low level interval) of the touch synchronization signal Tsync may correspond to a display interval. A low level interval (or high level interval) of the touch synchronization signal Tsync may correspond to a touch sensing interval.

As an example, a method of allocating a display interval and a touch sensing interval within one display frame period may be operated as follows. That is, one display frame period may be divided into one display interval and one touch sensing interval. Display driving may be performed during one display interval, and touch driving for sensing a touch input by a finger and a stylus may be performed during one touch sensing interval corresponding to a blank period.

As another example, as shown in FIG. 6, one display frame period 600 may be divided into two or more display intervals and two or more touch sensing intervals. Display driving may be performed for two or more display intervals within one display frame period, and touch driving for sensing touch inputs by a finger and a stylus at least once or twice in the entire area of the screen or in some areas during two or more touch sensing intervals may be performed.

In this way, when display driving and touch driving are performed by dividing one display frame period 600 into two or more display intervals and two or more touch sensing intervals, each of two or more blank periods corresponding to two or more touch sensing intervals within one display frame period 600 may be referred to as "long horizontal blank (LHB) interval". For example, two or more periods in which touch sensing for a stylus or a finger is performed within the display frame period 600 may be referred to as an LHB interval or a touch sensing interval. Touch driving performed for two or more LHB intervals within one display frame period may be referred to as LHB driving.

For example, as shown in FIG. 6, when 16 display intervals and 16 touch sensing intervals are alternately and repeatedly performed within one display frame period 600, the 16 touch sensing intervals may be referred to as LHB #1 (601), LHB #2 (602), LHB #3 (603), . . . , LHB #16 (616), respectively.

Hereinafter, embodiments of sensing a touch in a low-speed driving mode will be described with reference to FIGS. 7 to 10.

Figure 7:
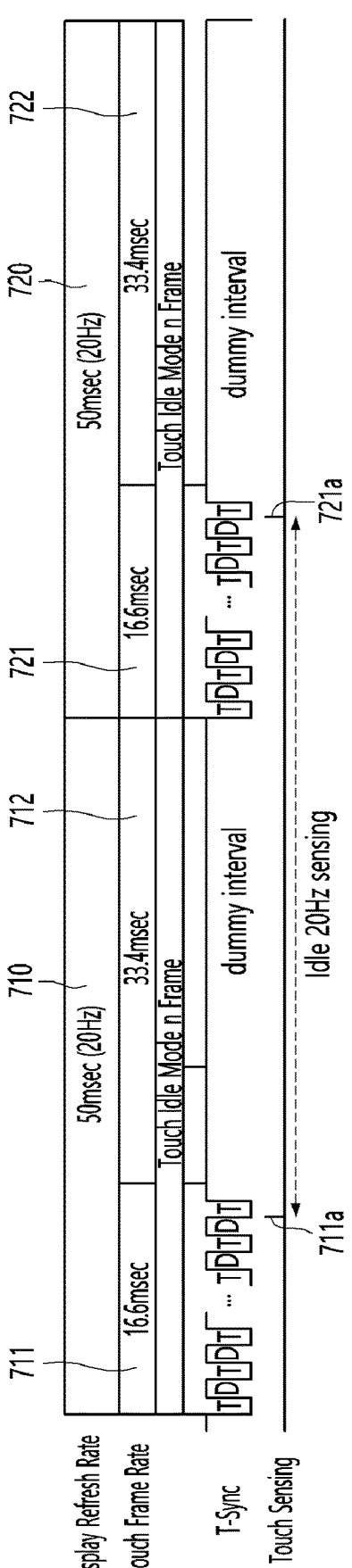
FIG. 7 is a diagram illustrating a touch sensing operation in a low-speed driving mode according to an embodiment.

FIG. 7 is a diagram illustrating a touch sensing operation in a low-speed driving mode according to an embodiment.

Referring to FIG. 7, the display device may include data writing intervals 711 and 721 and data holding intervals (e.g., dummy sections) 712, 722) within one display frame 710, 720 in a low-speed driving mode (e.g., LRR mode).

For example, the first display frame 710 may include a first data writing interval 711 and a first data holding interval 712. The second display frame 720 may include a second data writing interval 721 and a second data holding interval 722. A first data holding interval 712 may be located between the first data writing interval 711 and the second data writing interval 721.

According to an embodiment, assuming that one display frame is 50 ms in the low-speed driving mode, a display refresh rate may be 20 Hz. In FIG. 7, it is assumed that the data writing interval included in one display frame is 16.6 ms and the data holding interval is 33.4 ms. In the low-speed driving mode, the touch sensing mode may operate as an idle mode (e.g., touch idle mode). The display refresh rate of the low-speed driving mode may be determined based on the width of the data holding interval.

According to an embodiment, in the first data writing interval 711 or the second data writing interval 721, as illustrated, the display device may alternately repeat a display interval indicated by 'D' and a touch sensing interval (e.g., LHB interval) indicated by 'T'. According to an embodiment, the display driving circuit may be configured to output a display driving signal in a display interval within the first data writing interval 711 or the second data writing interval 721.

According to an embodiment, the touch driving circuit may sense a touch in any one touch sensing interval among a plurality of touch sensing intervals in the first data writing interval 711 or the second data writing interval 721 to detect or identify the presence or absence of a touch. As an example, in order to reduce current consumption, the display device may perform touch sensing (711a, 721a) for detecting the presence or absence of a touch in the last touch sensing interval (e.g., the last LHB) among a plurality of touch sensing intervals included in each data writing interval (711, 721).

For example, in order to reduce current consumption, the display device may identify (or check) whether a touch has occurred with respect to any one of the plurality of touch electrodes by detecting the presence or absence of a touch in a state in which a multiplexer (MUX) connected to each touch electrode TE of the panel 120 is short-circuited. As shown in FIG. 7, when the display device performs one-time touch sensing 711a and 721a in the last touch sensing interval (e.g., the last LHB) among the plurality of touch sensing intervals included in the respective data writing intervals 711 and 721, touch sensing frequency in the touch idle mode may be 20 Hz, which is the same as the display refresh rate.

Figure 8:
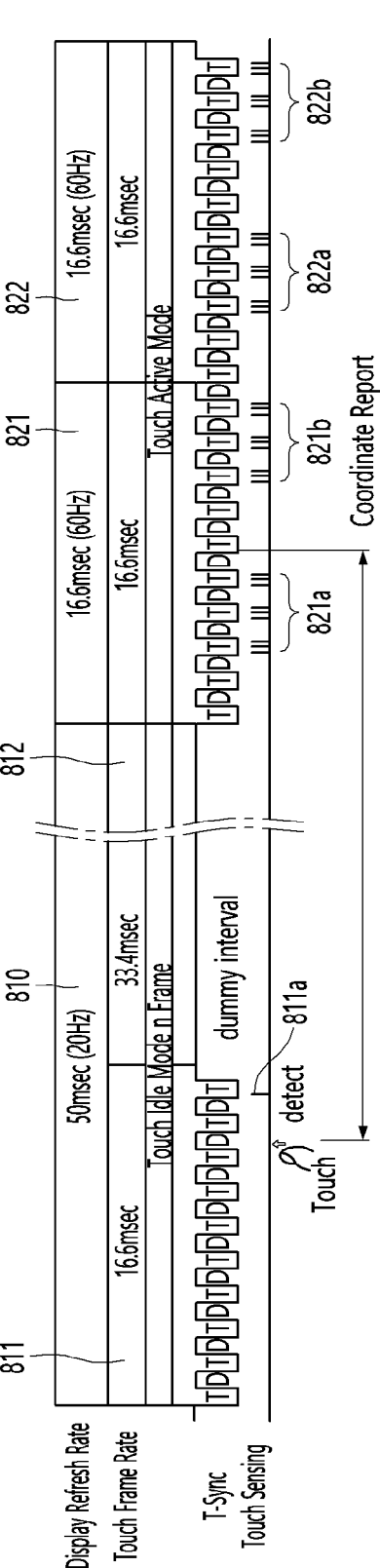
FIG. 8 is a diagram illustrating a situation in which a touch is detected in a low-speed driving mode according to an embodiment.

FIG. 8 is a diagram illustrating a situation in which a touch is detected in a low-speed driving mode according to an embodiment.

Referring to FIG. 8, the display device may comprise a first data writing interval 811 and a first data holding interval (e.g., dummy section) 812 within a first display frame 810 in a low-speed driving mode (e.g., LRR mode).

According to an embodiment, assuming that one display frame is 50 ms in the low-speed driving mode, a display refresh rate may be 20 Hz. In FIG. 8, it is assumed that the data writing interval included in one display frame is 16.6 ms and the data holding interval is 33.4 ms. In the low-speed driving mode, the touch sensing mode may operate as an idle mode (e.g., touch idle mode). The display refresh rate of the low-speed driving mode may be determined based on the width of the data holding interval.

According to an embodiment, in the first data writing interval 811, as illustrated, the display device may alternately repeat a display interval indicated by 'D' and a touch sensing interval (e.g., LHB interval) indicated by 'T'. According to an embodiment, the display driving circuit may be configured to output a display driving signal in a display interval within the first data writing interval 811.

According to an embodiment, the touch driving circuit may sense a touch in any one touch sensing interval among a plurality of touch sensing intervals in the first data writing interval 811 to detect or identify the presence or absence of a touch. As an example, in order to reduce current consumption, the display device may perform touch sensing 811a for detecting the presence or absence of a touch in the last touch sensing interval (e.g., the last LHB) among a plurality of touch sensing intervals included in the first data writing interval 811. For example, in order to reduce current consumption, the display device may identify whether a touch has occurred with respect to any one of a plurality of touch electrodes by detecting the presence or absence of a touch in a state in which a multiplexer MUX connected to each touch electrode TE of the panel 120 is short-circuited.

According to an embodiment, as shown in FIG. 8, in the case of identifying 811a whether there is a touch in the last touch sensing interval (e.g., the first touch sensing interval) among a plurality of touch sensing intervals included in the first data writing interval 811, the presence or absence of a touch may be identified., but the touch position cannot be identified. Accordingly, a report operation on the touched position may not be performed.

Accordingly, as a result of identifying (811a) whether or not the touch is present in the first touch sensing interval, the display device currently operating in the low-speed driving mode may proceed with the first data holding interval 812 according to the end of the first data writing interval 811 despite the detection of a touch.

Next, the display device may be converted from a low-speed driving mode to a basic driving mode (e.g., a normal mode) after the first data holding interval 812 ends as the touch is detected. For example, the display device may change the display refresh rate from 20 Hz to 60 Hz as the low-speed driving mode is switched to the basic driving mode.

Accordingly, the interval between the second display frame 821 and the third display frame 822 may be 16.6 ms. According to an embodiment, each of the second display frame 821 and the third display frame 822 may include only a data writing interval without a data holding interval.

According to an embodiment, when a touch is detected in the first touch sensing interval, the touch sensing unit 140 may switch to a touch active mode. The touch sensing unit 140 may perform touch sensing a plurality of times (e.g., 6 times) within one data writing interval.

For example, as illustrate, when six touch sensings 821a and 821b are performed in the second data writing interval corresponding to the second display frame 821, and six touch sensings 822a and 822b are performed in the third data writing interval corresponding to the third display frame 822, the touch sensing frequency may be 120 Hz.

Referring to FIG. 8, six touch sensings 821a and 821b may be performed in three LHBs (e.g., LHB #3, LHB #4, and LHB #5) in the first half of the second data writing interval corresponding to the second display frame 821 and three LHBs (e.g., LHB #8, LHB #9, and LHB #10) in the second half of the second data writing interval corresponding to the second display frame 821.

In addition, six touch sensings 822a and 822b may be performed in three LHBs (e.g., LHB #3, LHB #4, LHB #5) in the first half of the third data writing interval corresponding to the third display frame 822 and in three LHBs (e.g., LHB #8, LHB #9, LHB #10) in the second half of the third data writing interval corresponding to the third display frame 822.

In the touch sensing in the touch active mode, full sensing is performed such that a position where a touch occurs may be identified. For example, a position where a touch occurs may be identified by touch sensing through three LHBs (e.g., LHB #3, LHB #4, and LHB #5) in the first half. The position where the touch occurred can be identified by touch sensing through the last three LHBs (e.g., LHB #8, LHB #9, and LHB #10) in the second half.

According to an embodiment, referring to FIG. 8, after a touch is detected at the last LHB of the first data writing interval 811, at least as much time as the first data holding interval 812 (e.g., a dummy section) may elapse (e.g., a time of 33.4 ms or more has elapsed) until the position where the touch occurs is identified. A user who touches the screen of the display device in the low-speed drive mode may experience down latency as the touch position is reported and the touch result is reflected after the elapse of time equal to the first data holding interval 812.

Figure 9:
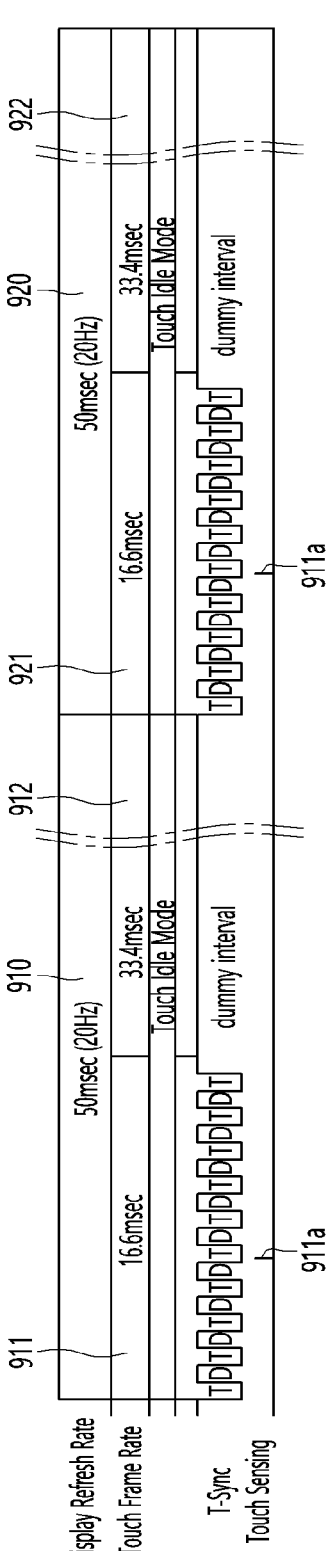
FIG. 9 is a diagram illustrating a touch sensing operation in a low-speed driving mode according to an embodiment.

FIG. 9 is a diagram illustrating a touch sensing operation in a low-speed driving mode according to an embodiment.

Referring to FIG. 9, the display device may include data writing intervals 911 and 921 and data holding intervals (e.g., dummy sections) 912, 922 within one display frame 910, 920 in a low-speed driving mode (e.g., LRR mode).

For example, the first display frame 910 may include a first data writing interval 911 and a first data holding interval 912. The second display frame 920 may include a second data writing interval 921 and a second data holding interval 922. A first data holding interval 912 may be located between the first data writing interval 911 and the second data writing interval 921.

According to an embodiment, assuming that one display frame is 50 ms in the low-speed driving mode, a display refresh rate may be 20 Hz. In FIG. 9, it is assumed that the data writing interval included in one display frame is 16.6 ms and the data holding interval is 33.4 ms. In the low-speed driving mode, the touch sensing mode may operate as an idle mode (e.g., touch idle mode). A display refresh rate in the low-speed driving mode may be determined based on the width of the data holding interval.

According to an embodiment, in the first data writing interval 911 or the second data writing interval 921, as illustrate, the display interval indicated by 'D' and the touch sensing interval indicated by 'T' (e.g., LHB interval) may be alternately repeated. According to an embodiment, the display driving circuit may be configured to output a display driving signal in a display interval within the first data writing interval 911 or the second data writing interval 921.

According to an embodiment, the touch driving circuit may sense a touch in any one touch sensing interval among a plurality of touch sensing intervals in the first data writing interval 911 or the second data writing interval 921 to detect or identify the presence or absence of a touch.

According to an embodiment, the display device may perform touch sensing (911a, 921a) for detecting the presence or absence of a touch in a previous touch sensing interval other than the last touch sensing interval (e.g., the last LHB) among a plurality of touch sensing intervals included in each of the data writing intervals 911 and 921.

FIG. 9 illustrates that touch sensing is performed in a fifth touch sensing interval (e.g., LHB #5) among a plurality of touch sensing intervals as an embodiment, but various embodiments are not limited to the above position.

For example, a touch sensing interval in which touch sensing is performed in the low-speed driving mode may be set in the first half of each of the data writing intervals 911 and 921.

As another example, the touch sensing interval in which touch sensing is performed in the low-speed driving mode may be set before three LHB intervals (e.g., any one LHB interval among LHB #1 to LHB #7) from the last LHB interval among a plurality of touch sensing intervals (e.g., LHB intervals) included in each of the data writing intervals 911 and 921.

Compared with FIGS. 7 and 8, in FIG. 9, touch sensing is performed in the previous LHB interval rather than the last LHB interval such that when a touch is detected, full sensing may be performed to identify the touch position within the same data writing interval 911 and 921 before switching to the data holding interval.

Figure 10:
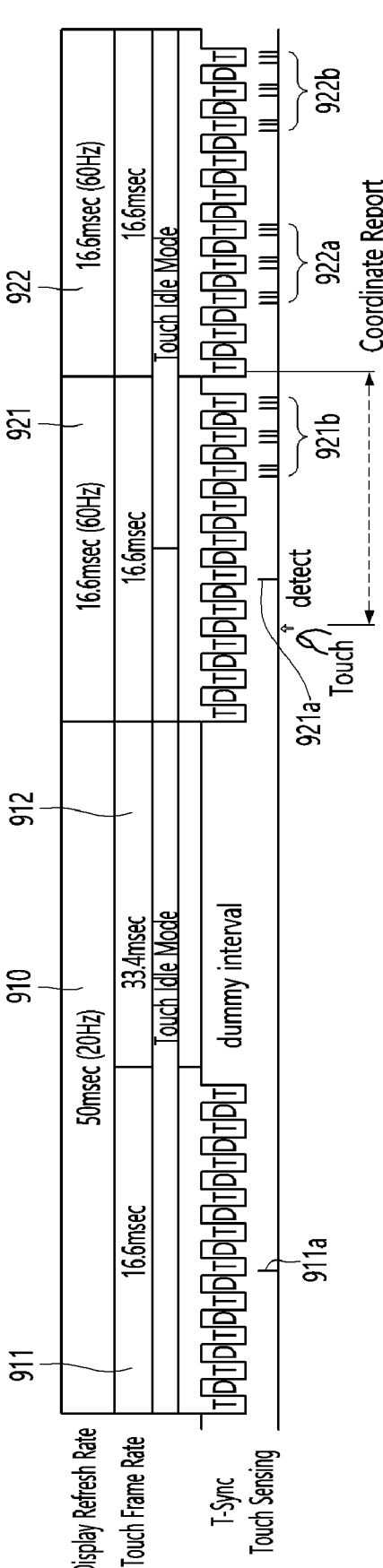
FIG. 10 is a diagram illustrating a situation in which a touch is detected in a low-speed driving mode according to an embodiment.

FIG. 10 is a diagram illustrating a situation in which a touch is detected in a low-speed driving mode according to an embodiment.

Referring to FIG. 10, the display device may include a first data writing interval 911 and a first data holding interval (e.g., a dummy section) 912 within a first display frame 910 in a low-speed driving mode (e.g., LRR mode).

As exemplified in the description of FIG. 9, the display device may perform touch sensing 911a and 921a to detect the presence or absence of a touch in a previous touch sensing interval rather than the last touch sensing interval (e.g., the last LHB) among a plurality of touch sensing intervals included in each of the data writing intervals 911 and 921.

FIG. 10 illustrates that touch sensing is performed in a fifth touch sensing interval (e.g., LHB #5) among a plurality of touch sensing intervals as an embodiment, but various embodiments are not limited to the above position.

As illustrated in FIG. 10, as a result of performing touch sensing 911a in the fifth touch sensing interval (e.g., LHB #5) of the first data writing interval 911 in the low-speed driving mode (e.g., LRR mode), when no touch is detected, the first data writing interval 911 may end. When the first data writing interval 911 ends, a first data holding interval 912 may proceed. When the first data holding interval 912 ends, a second data writing interval 921 may proceed.

According to an embodiment, when a touch is detected as shown in FIG. 10 as a result of performing the touch sensing 921a in the fifth touch sensing interval (e.g., LHB #5) of the second data writing interval 921, full sensing 921b may be performed to identify the touch position within the same data writing interval (e.g., the second data writing interval 921).

According to an embodiment, as shown in FIG. 10, when a touch is detected as a result of the touch sensing 921a in the fifth touch sensing interval (e.g., LHB #5), the touch idle mode may be switched to the touch active mode, and the full sensing may be performed For example, when a touch is detected in the second data writing interval 921 during the low-speed drive mode operation, full sensing may be performed in a subsequent touch sensing intervals (e.g., LHB #8, LHB #9, and LHB #10) within the second data writing interval 921 such that information (e.g., touch coordinate) corresponding to the touch position may be reported.

According to an embodiment, referring to FIG. 10, after a touch is detected at LHB #5 of the second data writing interval 921, the touch position within the same data writing interval (ie, the second data writing interval 921) may be reported and the touch result is reflected such that the down latency can be reduced.

Thereafter, as the display device operates in the basic driving mode, the touch position may be updated by performing full sensing 922a and 922b in the third data writing interval 922 corresponding to the third display frame.

FIG. 11 is a flowchart illustrating a touch sensing method according to an embodiment.

Referring to FIG. 11, the display device may operate in a low-speed driving mode in which a data holding interval is located between data writing intervals (step S1110).

According to an embodiment, in the low-speed driving mode, the display device may output a display driving signal in a display interval within each data writing interval and sense a touch in a touch sensing interval (step S1120).

According to an embodiment, when detection of a touch is identified in the touch sensing interval (S1130), the display device may transition to a touch active mode (S1140) in response to confirming that the touch is detected. Thereafter, the display device may identify the position of the detected touch in a subsequent touch sensing interval within the same data writing interval (S1150).

For example, in the low-speed driving mode, after a touch is detected in a touch sensing interval within a specific data writing interval, the touch position is reported within the same data writing interval and the touch result is reflected such that down latency that can occur in a low-speed drive mode in which a data holding interval exists can be reduced.

A driving signal output device and a display device including the same according to an embodiment may be applied to a liquid crystal display (LCD) display device, an organic light emitting diode (OLED) display device, a plasma display panel (PDP) display device, or the like.

For example, it may be applied to a display panel or a touch panel of a TV, a notebook, a mobile device, etc., but is not limited thereto.

What is claimed is:

1. A driving signal output device, comprising:
   a display driving circuit configured to output a display driving signal in a display interval within a first data writing interval, in a low-speed driving mode in which a data holding interval is located between data writing intervals; and
   a touch driving circuit configured to identify that a first touch is detected in a first touch sensing interval within the first data writing interval and to identify a position of the first touch in a second touch sensing interval within the first data writing interval, wherein the first data writing interval comprises the display interval, the first touch sensing interval, and the second touch sensing interval, and wherein the first touch sensing interval is configured to precede a last touch sensing interval among a plurality of touch sensing intervals included in the first data writing interval, and the second touch sensing interval is located between the first touch sensing interval and the last touch sensing interval within the first data writing interval, and the display interval is located between the first touch sensing interval and the second touch sensing interval.

2. The driving signal output device of claim 1, wherein a first data holding interval is located between the first data writing interval and a second data writing interval.

3. The driving signal output device of claim 1, wherein a display refresh rate of the low-speed driving mode is determined based on a width of the data holding interval.

4. The driving signal output device of claim 1, wherein the touch driving circuit is configured to identify presence or absence of a touch in the first touch sensing interval.

5. The driving signal output device of claim 1, wherein the touch driving circuit is configured to operate in a touch active mode based on identifying that the first touch is detected in the first touch sensing interval.

6. The driving signal output device of claim 1, wherein the touch driving circuit is configured to externally transmit information corresponding to the position of the first touch identified in the second touch sensing interval.

7. The driving signal output device of claim 1, wherein the first touch sensing interval is set in a first half of the first data writing interval.

8. The driving signal output device of claim 1, wherein the first touch sensing interval or the second touch sensing interval is set in a long horizontal blank (LHB) interval.

9. The driving signal output device of claim 8, wherein the first touch sensing interval is set before three LHB intervals from the last LHB interval among a plurality of LHB intervals included in the first data writing interval.

10. The driving signal output device of claim 1, wherein a driving signal output circuit is configured to output the display driving signal based on a synchronization signal received from a timing controller.

11. A driving signal output method, comprising:
   operating in a low-speed driving mode in which a data holding interval is located between data writing intervals;
   outputting a display driving signal in a display interval within a first data writing interval in the low-speed driving mode;
   identifying that a first touch is detected in a first touch sensing interval within the first data writing interval; and
   identifying a position of the first touch in a second touch sensing interval within the first data writing interval in response to identifying that the first touch is detected, wherein the first data writing interval comprises the display interval, the first touch sensing interval, and the second touch sensing interval, and wherein the first touch sensing interval is configured to precede a last touch sensing interval among a plurality of touch sensing intervals included in the first data writing interval, and the second touch sensing interval is located between the first touch sensing interval and the last touch sensing interval within the first data writing interval, and the display interval is located between the first touch sensing interval and the second touch sensing interval.

12. The driving signal output method of claim 11, wherein the identifying that the first touch is detected in the first touch sensing interval within the first data writing interval comprises:
   identifying presence or absence of a touch in the first touch sensing interval.

13. The driving signal output method of claim 11, further comprising:
   operating in a touch active mode based on identifying that the first touch is detected in the first touch sensing interval.

14. The driving signal output method of claim 11, wherein the first touch sensing interval is set in a first half of the first data writing interval.

15. The driving signal output method of claim 11, wherein the first touch sensing interval or the second touch sensing interval is set in a long horizontal blank (LHB) interval.

16. The driving signal output method of claim 15, wherein the first touch sensing interval is set before three LHB intervals from the last LHB interval among a plurality of LHB intervals included in the first data writing interval.

17. A display device, comprising:
   a panel;
   a display driving circuit configured to output a display driving signal to the panel in a display interval within a first data writing interval, in a low-speed driving mode in which a data holding interval is located between data writing intervals; and
   a touch driving circuit configured to identify that a first touch is detected in a first touch sensing interval within the first data writing interval and to identify a position of the first touch in a second touch sensing interval within the first data writing interval, wherein the first data writing interval comprises the display interval, the first touch sensing interval, and the second touch sensing interval, and wherein the first touch sensing interval is configured to precede a last touch sensing interval among a plurality of touch sensing intervals included in the first data writing interval, and the second touch sensing interval is located between the first touch sensing interval and the last touch sensing interval within the first data writing interval, and the display interval is located between the first touch sensing interval and the second touch sensing interval.

18. The display device of claim 17, wherein the first touch sensing interval is set in a first half of the first data writing interval.

19. The display device of claim 17, wherein the first touch sensing interval or the second touch sensing interval is set in a long horizontal blank (LHB) interval.

20. The display device of claim 19, wherein the first touch sensing interval is set before three LHB intervals from the last LHB interval among a plurality of LHB intervals included in the first data writing interval.

* * * * *